July 15, 1947.  F. JANCHAN  2,424,096
ARTIFICIAL BAIT
Filed Oct. 18, 1944
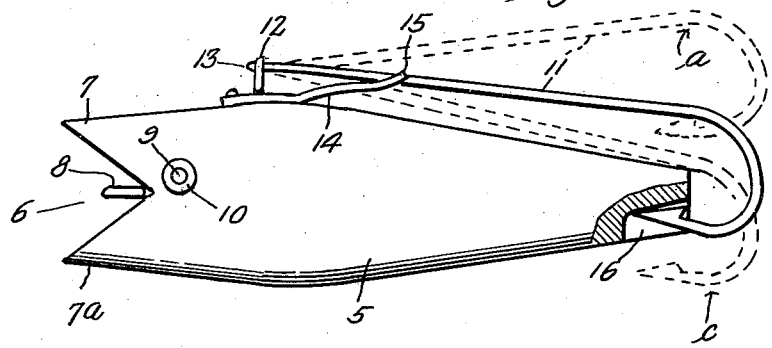
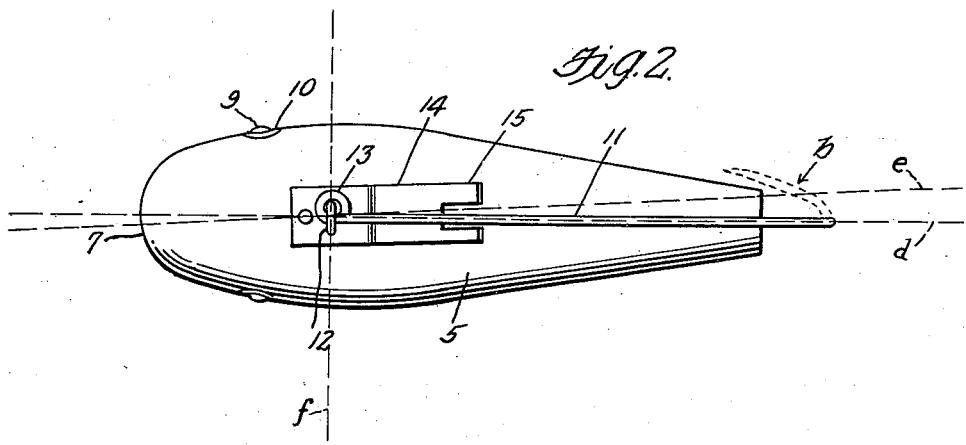
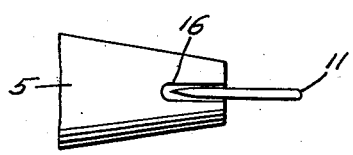
Inventor
Francis Janchan
By Clarence A. O'Brien
and Harvey B. Jacobson
Attorneys Patented July 15, 1947

2,424,096

UNITED STATES PATENT OFFICE 2,424,096

ARTIFICIAL BAIT

Francis Janchan, Milwaukee, Wis.

Application October 18, 1944, Serial No. 559,271

3 Claims. (Cl. 43—39)

This invention relates to artificial fishing bait, and the primary object of the invention is to provide a device of this kind having a hook whose barbed hooked end is releasably held in retracted position within a recess provided in the under side of the tail end of the bait body, so that it may not catch upon weeds or other objects encountered under the surface of the water. The hooked end of the hook is readily releasable by the fish in striking the bait, and a spring is provided to swing the hook upwardly and elevate the hooked end of the latter above the tail end of the bait body when said hooked end is released.

An important object of the present invention is to provide an artificial bait of the above character which is extremely simple and durable in construction, easy and cheap to manufacture, easy to use, and efficient in operation.

The exact nature of the present invention will become apparent from the following description when considered in connection with the accompanying drawing, and the invention consists in the novel form, combination and arrangement of parts hereinafter more fully described, shown in the drawing and claimed.

In the drawing, wherein like reference characters indicate corresponding parts throughout the several views:

Figure 1 is a side elevational view, partly broken away and in section, of an artificial bait constructed in accordance with the present invention, the hooked end of the fishing hook being engaged in the recess provided in the tail end of the bait body.

Figure 2 is a top plan view thereof.

Figure 3 is a fragmentary bottom plan view of the tail end portion of the bait shown in Figure 1.

Referring in detail to the drawing, the present artificial bait includes an elongated body 5 which is preferably constructed of wood and finished in suitable colors for attracting fish to be caught, said body being shown as in the general shape of a minnow or other small fish with an open mouth. For the latter purpose, the larger head end of the bait body is provided with a transverse V-shaped recess 6 defining the upper and lower jaws 7 and 7a of the artificial fish. An eye member 8 may be secured to the front end of the body centrally between the jaws 7 and 7a for attachment of the fishing line thereto. Also, a transverse headed pin 9 is extended through the head end of the body 5 immediately back of the jaws and has washers 10 thereon adjacent its headed ends so as to thereby simulate the eyes of the artificial fish.

The present invention is more especially concerned with the manner of mounting a fishing hook 11 upon the bait body and protecting its hooked end against becoming caught upon weeds and the like encountered under the surface of the water. An eye member 12 is secured upon the body 5 at the head end of the latter, but rearwardly of the jaws 7 and 7a, and loosely pivotally engaged in the eye 12 is another eye 13 provided on the free end of the shank of the fishing hook 11. This provides a substantially universal pivotal connection between the hook and the body of the bait, and a leaf spring 14 is fixed upon the bait body 5 at the eye 12 and has a free rearwardly and upwardly extending end portion which bears against the under side of the shank of hook 11 for normally elevating the latter so that its hooked end is positioned above the tail end of the body, as indicated by dotted lines at $a$ in Figure 1. The free rear end of spring 14 is bifurcated, and the shank of hook 11 extends rearwardly between the furcations 15 of the spring. The hook is of such size that its hooked end portion extends beyond the tail end of the body 5 and then extends forwardly at its barbed end within the limits of the tail end portion of the bait body for engagement within a narrow longitudinal elongated recess 16 provided in the under side of the tail end portion of the bait body, as shown clearly in Figures 1 and 3.

Engagement of the barbed end of the hook in the recess 16 is effected by first turning the hook slightly about the axis of its shank so as to laterally tilt the hooked end portion of the hook, as indicated by dotted lines at $b$ in Figure 2, and then pressing downwardly on the hook against the action of spring 14 until the barbed end of the hook is located below the tail end of the body, as indicated by dotted lines at $c$ in Figure 1. The hook is then turned backwardly until the hooked end portion thereof is vertically disposed with its barbed end in vertical alignment with the recess 16, and then the hook is released so that the hook is raised by spring 14 to engage the barbed end of the hook in the recess 16. It is here noted that the spring 14 is disposed at a slight angle to the longitudinal axis $d$ of the bait body 5, as indicated by line $e$, the plane of the eye 12 being at a right angle to such axis as indicated by line $f$ and the central slot forming the furcations 15 of the spring is of a width greater than the diameter of the hook shank. This positions one furcation adjacent one side of the hook shank and the other slightly spaced from the opposite side of the hook shank, as shown in Figure 2. By reason of this arrangement, the spring causes the hook to automatically undergo a slight turning movement about the axis of the hook shank when the hook is pressed downwardly toward the body 5. This turning movement is permitted due to the loose, substantially universal pivotal connection between the hook and the eye 12, and it is therefore not necessary to grasp and turn the hook in depressing it for engagement of the barbed end of the hook in the recess 16. While the manner in which the parts coact to bring about this result is peculiar and may not be clearly explainable, such action takes place in actual practice by reason of the form and relation of parts as described. Conversely, when a downward movement is imparted to the hooked end portion of the hook by the fish in striking the bait, such movement not only disengages the barbed end of the hook from the recess 16, but results in a slight turning action of the hook so that its hooked end will tilt laterally to the position *b* of Figure 2 and permit the spring 14 to elevate the tilted hook to the dotted line position *a* above the body 5 for effectively hooking or catching the fish.

From the foregoing description, it is believed that the construction and operation, as well as the advantages of the present invention will be readily understood and appreciated by those skilled in the art. It will be apparent that the construction is very simple and economical to manufacture, easy to use, and efficient in operation.

What I claim is:

1. An artificial bait comprising an elongated body having an arrow longitudinal recess in its tail portion, a fishing hook having the free end of its shank loosely pivoted to the body near the head end of the latter for substantially universal movement, and a leaf spring mounted on the body at an angle to the longitudinal axis of the latter and having a free end loosely engaged with the shank of the hook, said spring being tensioned and arranged to laterally tilt and swing the fishing hook relative to and away from the body after the hook is moved toward the body to disengage said hooked end from the recess.

2. An artificial bait comprising an elongated body having a narrow longitudinal recess in the under side of its tail portion, a fishing hook having the free end of its shank loosely pivoted upon the body near the head end of the latter for substantially universal movement, and a spring mounted on the body and engaged with the shank of the hook, said spring being tensioned to elevate the hooked end of the fishing hook above the tail end of the body when said hooked end is disengaged from the recess, said spring comprising a spring strip having an upwardly and rearwardly extending free end portion terminating in a bifurcated end, the shank of the hook being received between the furcations of said bifurcated end.

3. An artificial bait comprising an elongated body having a narrow longitudinal recess in the under side of its tail portion, a fishing hook having the free end of its shank loosely pivoted upon the body near the head end of the latter for substantially universal movement, and a spring mounted on the body at an angle to the longitudinal axis of the latter and having a free end loosely engaged with the shank of the hook, said spring being tensioned to elevate the hooked end of the fishing hook above the tail end of the body when said hooked end is disengaged from the recess, said spring comprising a spring strip having an upwardly and rearwardly extending free end portion terminating in a bifurcated end, the shank of the hook being loosely received between the furcations of said bifurcated end, one furcation of the spring being in spaced relation to one side of the hook shank and the other furcation being closely adjacent the other side of the shank.

FRANCIS JANCHAN.

REFERENCES CITED

The following references are of record in the file of this patent:

UNITED STATES PATENTS

| Number | Name | Date |
| --- | --- | --- |
| 1,723,193 | McLaughlin | Aug. 6, 1929 |
| 1,808,565 | McLaughlin | June 2, 1931 |
| 1,869,111 | McLaughlin | July 26, 1932 |
| 1,537,266 | Ryan | May 12, 1925 |
| 378,678 | Harlow | Feb. 28, 1888 |
| 2,319,686 | Janisch | May 18, 1943 |